(12) United States Patent  
Nakamura et al.

(10) Patent No.: US 7,649,167 B2  
(45) Date of Patent: Jan. 19, 2010

(54) ROTARY ENCODER HAVING AT LEAST ONE DEPRESSION AREA FORMED CONTINUOUSLY WITH A DEFINED DEPTH ALONG THE PERIPHERY OF A BEARING FIXATION REGION

(75) Inventors: Yoshiyuki Nakamura, Aikawa-machi (JP); Masato Takahashi, Hachiouji (JP)

(73) Assignee: Dr. Johannes Heidenhain GmbH, Traunreut (FR)

( * ) Notice: Subject to any disclaimer, the term of this patent is extended or adjusted under 35 U.S.C. 154(b) by 407 days.

(21) Appl. No.: 11/794,484

(22) PCT Filed: Nov. 26, 2005

(86) PCT No.: PCT/EP2005/012665

§ 371 (c)(1),  
(2), (4) Date: Jun. 25, 2007

(87) PCT Pub. No.: WO2006/069613

PCT Pub. Date: Jul. 6, 2006

(65) Prior Publication Data

US 2008/0144019 A1 Jun. 19, 2008

(30) Foreign Application Priority Data

Dec. 28, 2004 (JP) .............................. 2004-380677

(51) Int. Cl.  
*G01D 5/34* (2006.01)

(52) U.S. Cl. ................... 250/231.13; 250/239

(58) Field of Classification Search ............ 250/231.13, 250/239, 236, 238, 221; 341/11, 13  
See application file for complete search history.

(56) References Cited

U.S. PATENT DOCUMENTS 5,315,865 A * 5/1994 Hornfeck et al. ......... 73/114.36

(Continued)

FOREIGN PATENT DOCUMENTS

DE 44 46 243 3/1996

(Continued)

OTHER PUBLICATIONS

International Search Report, PCT International Patent Application No. PCT/EP2005/012665, dated Apr. 18, 2006.

(Continued)

*Primary Examiner*—Que T Le  
(74) *Attorney, Agent, or Firm*—Kenyon & Kenyon LLP

(57) ABSTRACT

A rotary encoder for determining the rotation of an object to be measured includes a shaft that is coupled to the rotation of the object to be measured, as well as at least one bearing in which the shaft is rotationally mounted. The rotary encoder also has a rotary-transducer base member having a bearing fixation region at which the bearing is fixed in position, at least one depression area being formed continuously with a defined depth on the rotary-transducer base member along the periphery of the bearing fixation region such that it surrounds at least half the periphery of the bearing fixation region.

14 Claims, 11 Drawing Sheets

U.S. PATENT DOCUMENTS

| | | |
|---|---|---|
| 5,571,960 A | 11/1996 | Tateishi et al. |
| 5,744,706 A | 4/1998 | Siraky |
| 6,107,704 A | 8/2000 | Wallner et al. |
| 6,291,914 B1 | 9/2001 | Mukaiyama |
| 6,541,958 B2 | 4/2003 | Harada |
| 6,901,682 B2 | 6/2005 | Igaki et al. |

FOREIGN PATENT DOCUMENTS

| | | |
|---|---|---|
| DE | 196 51 660 | 6/1998 |
| DE | 101 37 400 | 2/2002 |
| EP | 1 043 570 | 10/2000 |
| EP | 1 258 710 | 11/2002 |
| JP | 2001-27551 | 1/2001 |

OTHER PUBLICATIONS

International Preliminary Report on Patentability, PCT International Patent Application No. PCT/EP2005/012665, dated Dec. 20, 2006 (English-language translation provided).

* cited by examiner

PRIOR ART

PRIOR ART

PRIOR ART

PRIOR ART

ROTARY ENCODER HAVING AT LEAST ONE DEPRESSION AREA FORMED CONTINUOUSLY WITH A DEFINED DEPTH ALONG THE PERIPHERY OF A BEARING FIXATION REGION

FIELD OF THE INVENTION

The present invention relates to a rotary encoder, which, for example, is disposed on the shaft of a rotor in a motor and determines the number of revolutions per unit time and/or the rotational-angle position of the rotor.

BACKGROUND INFORMATION

Conventional rotary encoders are constructed as shown, for example, in FIGS. 8 and 9. FIG. 8 is a front view with the configuration of the rotary-transducer base member and the bearing area, and FIG. 9 is a cross-sectional view taken along line A-A of FIG. 8, the view of FIG. 8 having been supplemented with further components of the rotary encoder. To make it easier to understand the arrangement, base-plate supports 1a, which are not actually located at this position in the cross-sectional view, are also indicated in FIG. 9.

The rotary encoder has a rotary-transducer base member 1, bearings 2 disposed on rotary-transducer base member 1, and a hollow shaft 3 rotatably supported by these bearings 2. The shaft of an object to be measured is inserted into the hollow region of the end of shaft 3 to the left in FIG. 9, making it possible to couple shaft 3 of the rotary encoder to the rotation of the object to be measured. At the right end of shaft 3, a code disk 4 is mounted which rotates coupled with the rotation of the shaft. Because of the rotation, the annular measuring graduation on code disk 4 rotates, which is made up of alternating slots and opaque areas.

Mounted on supports 1a of rotary-transducer base member 1 is a base plate 5 or board, which corresponds to the shape of rotary-transducer base member 1. At a specific location of base plate 5, a detector element 6 is disposed, which is provided with a fixed scanning graduation 7 situated in front of it. In addition, further electronic components and circuits for processing the electrical signals from detector element 6 are formed and arranged on the base plate. A light source 8 is disposed in a recess or opening 1b formed on rotary-transducer base member 1, the respective positions being coordinated such that light source 8 is opposite detector element 6, with code disk 4 interposing. The light from light source 8 passes through the transparent slots formed on code disk 4 and strikes detector element 6, before which fixed scanning graduation 7 is situated. By detecting the light which passes through the measuring graduation of the code disk, it is possible to determine the rotational position of code disk 4, that is, the rotational position of the object to be measured.

FIGS. 10 and 11 show the construction of another conventional rotary encoder, FIG. 10 being a front view of the configuration of the rotary-transducer base member and the bearing area. FIG. 11 a cross-sectional view taken along line A-A from FIG. 10, in which the view of FIG. 10 is supplemented with further components of the rotary encoder. In this example, for reasons of weight, a thin region 1d is formed between periphery 1g of rotary-transducer base member 1 and a bearing fixation region 1e, and a rib 1c is formed for reinforcement between supports 1a and bearing fixation region 1e. The further components correspond to those of FIGS. 8 and 9, which is why identical components are provided with identical reference numerals, and their explanation is omitted.

The following problems exist in connection with conventional rotary encoders constructed in this manner. As mentioned above, shaft 3 is disposed via bearings 2 on rotary-transducer base member 1. While rotary-transducer base member 1 is normally made of a metal that is light and easy to work such as aluminum or something similar, iron is often selected as material for bearings 3. Therefore, if there is a change of temperature in the rotary-transducer surroundings, an unwanted mechanical stress or load of the rotary encoder results because of the different coefficients of thermal expansion owing to the different properties of the two materials. Due to the stress on the part of rotary-transducer base member 1, bearings 2 can deform, which may result in rotational irregularities or torque fluctuations of shaft 3.

This may even have an effect on the object to be measured. Therefore, the danger exists of disadvantageously influencing the exact measurement of the rotational speed and the rotational position, i.e., disadvantageously influencing the positioning accuracy. If the connection to the object to be measured is accomplished via a belt or something similar, the belt will slip and measuring errors will occur.

Optical rotary encoders having a design of this kind are described, for instance, in Japanese Published Patent Application No. 2001-27551. However, the problem mentioned in connection with the influence of different coefficients of thermal expansion of the rotary-transducer base member and of the bearings is not mentioned.

SUMMARY

Example embodiments of the present invention provide a rotary encoder having a construction such that the influence due to stress deformations because of the different coefficients of thermal expansion of the rotary-transducer base member and of the bearings may be eliminated, and to the greatest extent possible, rotational irregularities or torque fluctuations due to temperature changes do not occur.

According to example embodiments of the present invention, the rotary encoder for determining the rotation of an object to be measured has a shaft that is coupled to the rotation of the object to be measured, at least one bearing in which the shaft is rotationally mounted, as well as a rotary-transducer base member having a bearing fixation region at which the bearing is fixed in position. At least one depression area is formed continuously with a defined depth on the rotary-transducer base member along the periphery of the bearing fixation region such that it surrounds at least half the periphery of the bearing fixation region.

The depth of the depression area may be selected to be at least greater than the thickness of one bearing.

The depression area may extend over the entire periphery of the bearing fixation region.

The depression area may be formed in the interior of the rotary encoder.

The depression area may be formed at the outer side of the rotary encoder.

The depression area may include two partial depression areas, of which a first partial depression area is formed in the interior of the rotary encoder, and a second partial depression area is formed at the outer side of the rotary encoder.

A rotary encoder may be provided having a construction in which the influence of stress deformations because of the different coefficients of thermal expansion of the rotary-transducer base member and of the bearings is minimized, and therefore rotational irregularities or torque fluctuations due to changes in temperature are able to occur only to a negligible extent. It is thereby possible for a highly precise measurement to become even more exact. In addition, the influence on the object to be measured can also be reduced to a minimum.

Due to the formation of the depression at the peripheral area of the bearing fixation region of the rotary-transducer base member, at least one part of the bearing fixation region is implemented as a thin area, thereby making it possible to suppress the influence of a stress resulting from the different coefficients of thermal expansion of the rotary-transducer base member and of the bearings. This thin area has the function of reducing the development of the stress itself, and of allowing a stress which may have developed to disappear.

Since the aim is to form a thin area, it is desirable to form the depression area close to the bearing fixation region. Basically, the smaller the thickness of the thin area, the greater the effectiveness. However, since the mechanical fixation of the bearings may be insufficient if the thickness is too slight, the necessary thickness should be deduced or optimized based on an overall assessment of the size, form and construction, etc., of the rotary encoder.

Since the depth of the depression area is identical to the height of the thin area, in general, the greater the thin area, that is, the greater the depth of the depression, the higher the mechanical effectiveness. However, since too great a depth has a negative influence with respect to the overall mechanical stability, as explained above, the depth should be derived from an overall assessment of the size, the form, the construction, the necessary strength, etc., of the rotary encoder. Since normally two bearings are used, the depth should amount to at least the thickness of one bearing in the direction of the longitudinal shaft axis. It may be provided that a depth up to the mounting position of the second bearing is selected, e.g., a depth up to at least ⅓ of the mounting position of the second bearing.

The width of the depression area in the radial direction is not limited and may be selected as desired. However, since too great a width can lead to reduced mechanical stability of the rotary-transducer base member, it should be a selected width that permits easy processing and that is able to sufficiently accommodate possible deformations. In the case of small rotary encoders, normally this size lies in the range of several mm to just over, e.g., 10 mm.

As far as the length of the depression area in the shaft circumferential direction, that is, the length of the thin area is concerned, the greater this length, the higher the effectiveness of the area. Furthermore, it is favorable if the length encompasses the entire periphery of the shaft. Should this not be possible due to the design, the length should at least be as long as possible. If the entire periphery of the shaft is not surrounded, but rather only a part thereof, then e.g., at least half the periphery of the shaft, e.g., at least ⅔ of the shaft should be surrounded. In general, the closer the length of the depression area comes to the entire periphery, the higher the effectiveness.

The depression area may be formed both at the outer side and at the inner side of the rotary-transducer base member, that is, at the side at which the code disk is mounted, as well as at the opposite side. The depression area may also be formed on both sides. The decision about the side on which it is formed may be made depending on the arrangement and the type of rotary encoder, the strength required, etc.

According to an example embodiment of the present invention, a rotary encoder for determining rotation of an object to be measured includes: a shaft coupleable to a rotatable portion of the object to be measured; a code disk mounted at an end of the shaft; a least one bearing, the shaft rotationally mounted on the bearing; and a rotary-transducer base member including a bearing fixation region, the bearing fixed in position at the bearing fixation region, the rotary-transducer base member including at least one depression area open to a side at which the code disk is arranged, a part of the bearing fixation region formed as a thin area, and the depression area formed continuously with a defined depth along a periphery of the bearing fixation region to surround at least half of the periphery of the bearing fixation region.

According to an example embodiment of the present invention, a rotary encoder for determining rotation of an object to be measured includes: a shaft coupled to a rotatable portion of the object to be measured; a code disk mounted at an end of the shaft; a least one bearing, the shaft rotationally mounted on the bearing; and a rotary-transducer base member including a bearing fixation region, the bearing fixed in position at the bearing fixation region, the rotary-transducer base member including at least one depression area open to a side at which the code disk is arranged, a part of the bearing fixation region formed as a thin area, and the depression area formed continuously with a defined depth along a periphery of the bearing fixation region to surround at least half of the periphery of the bearing fixation region.

Other features and aspects of example embodiments of the present invention are described in more detail below with reference to the appended Figures.

DETAILED DESCRIPTION

Figure 1:
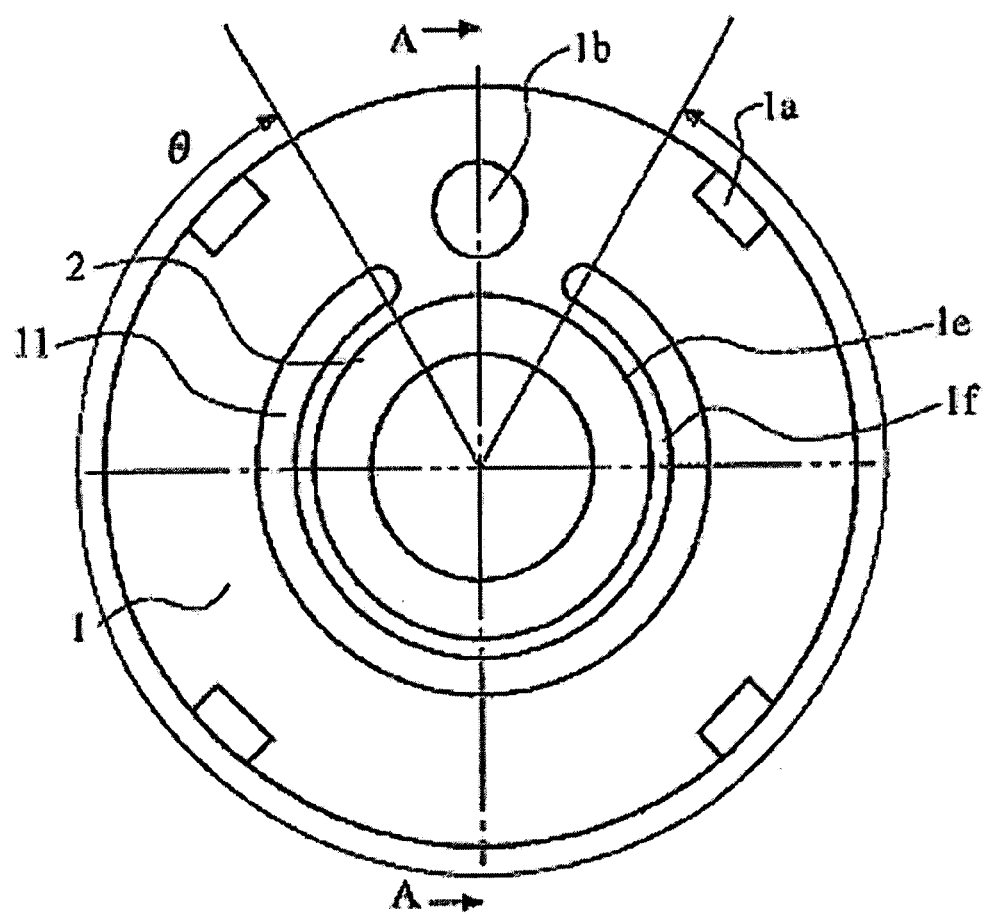
FIG. 1 is a front view of a configuration of a rotary-transducer base member and of a bearing area of the rotary encoder according to an example embodiment of the present invention.
Figure 2:
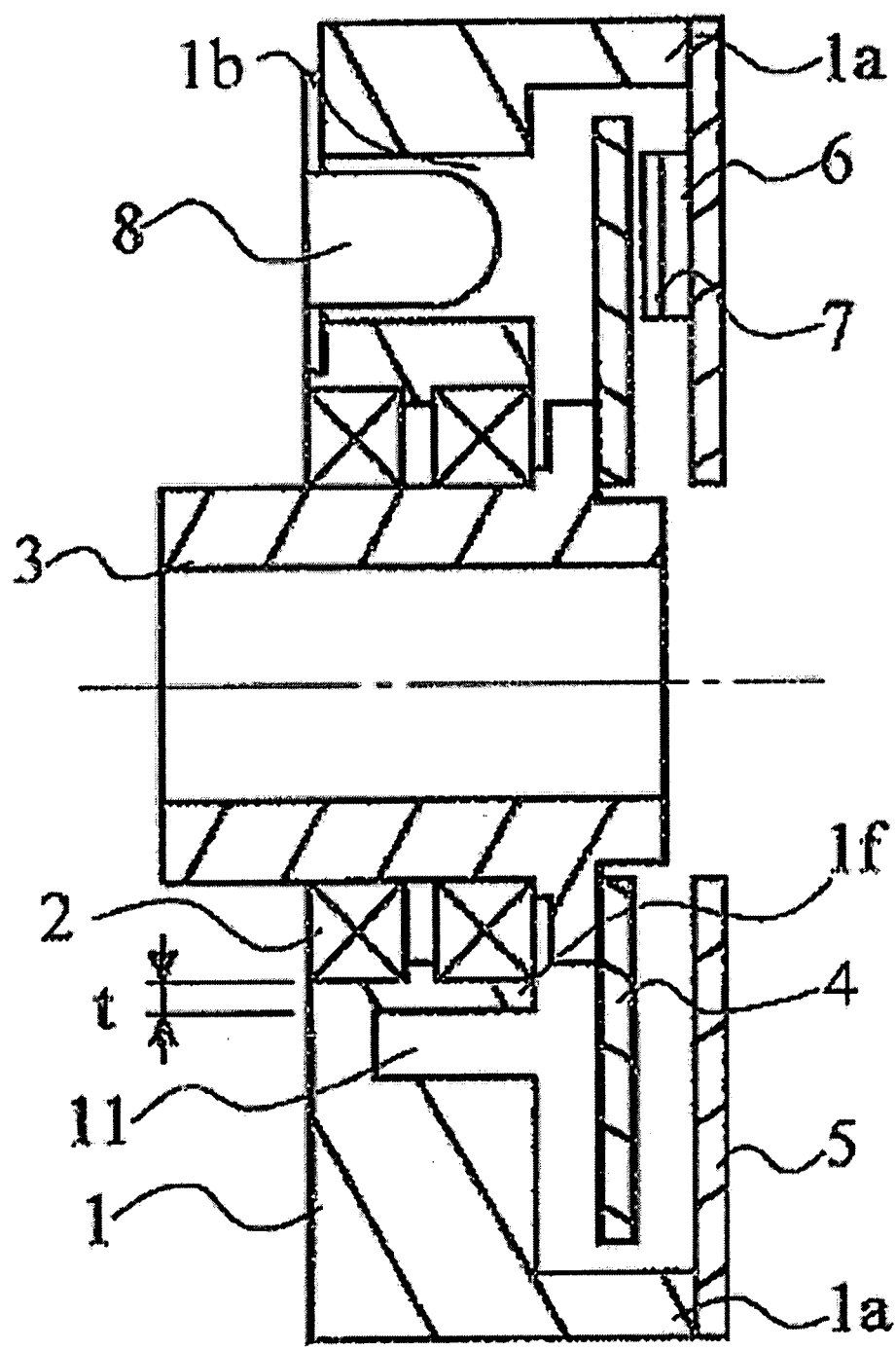
FIG. 2 is a cross-sectional view taken along line A-A in FIG. 1.

FIGS. 1 and 2 illustrate a rotary encoder according to an example embodiment of the present invention. FIG. 1 is a front view of the configuration of the rotary-transducer base member and the bearing area. FIG. 2 is a cross-sectional view taken along line A-A of FIG. 1, the view of FIG. 1 having been supplemented with further components of the rotary encoder. To make it easier to understand the arrangement, base-plate supports 1a, which are not actually located at this position in the cross-sectional view, are indicated in the view of FIG. 2.

According to the Figures, the rotary encoder includes a rotary-transducer base member 1, bearings 2 mounted at a bearing fixation region 1e of rotary-transducer base member 1, and a shaft 3 in the form of a hollow shaft which is mounted on bearings 2 and thereby retained in a manner allowing rotation. Two bearings 2 are used in this example. Shaft 3 is retained at two points by the two bearings disposed at a slight distance from each other. The rotary-transducer base member is constructed such that these bearings may be easily mounted and positioned.

The shaft of an object to be measured is mounted by insertion into the hollow region of the end of shaft 3 to the left according to the views provided in the Figures, thereby making it possible to couple shaft 3 of the rotary encoder to the rotation of the object to be measured. For example, highly accurate positioning motors such as servo motors or pulse motors, widely varying types of motors or drive devices or built-on accessories driven by hand-movement input devices may be considered as objects to be measured. Their angular position, their rotational speed, their number of revolutions per unit time, etc., are measured with the aid of the rotary encoder.

At the right end of shaft 3, a code disk 4 is mounted which rotates coupled with the rotation of shaft 3. Due to this rotation, the image of an optical measuring graduation on code disk 4 changes on the detection side.

Mounted on supports 1a of rotary-transducer base member 1 is a base plate 5 or board which corresponds to the shape of rotary-transducer base member 1. At a specific location of the base plate, a detector element 6 such as, for instance, a photo transistor or a photodiode is disposed, in front of which is a fixed scanning graduation 7. In addition, electronic elements and circuits for processing the electrical signals from detector element 6 and for the connection to the outside are formed and arranged on base plate 5. Detector element 6 may also include a plurality of cells. A light source 8, such as a light-emitting diode, is inserted in a recess or opening 1b formed on rotary-transducer base member 1 for mounting a light source. The respective positions are coordinated such that light source 8 is located exactly opposite detector element 6, with code disk 4 situated in between. The light from light source 8 passes through the optical slots formed on code disk 4 and strikes detector element 6. Based on the slot pattern detected on the detector side, it is possible to identify the rotational position of code disk 4, that is, the rotational position of the object to be measured.

Close to bearing fixation region 1e of rotary-transducer base member 1, a depression area 11 is formed that is open toward the interior of the rotary encoder, i.e., toward the side at which code disk 4 is disposed, such that the depression area partially encircles bearing fixation region 1e. A part of bearing fixation region 1e thereby becomes a thin area 1f having a thickness t. In the area in which depression area 11 does not continue, opening 1b is located for mounting the light source, depression area 11 being implemented so that it is kept away precisely from this opening. In this example, depression area 11 has a width which is slightly narrower than the width of bearings 2, while its depth is greater than the thickness of one bearing and extends up to a part (e.g., approximately ⅓) of the area in which the second bearing is mounted. In this example, the continuous area of depression area 11 encompasses an angular range θ of approximately 300° encircling shaft 3.

Figure 3:
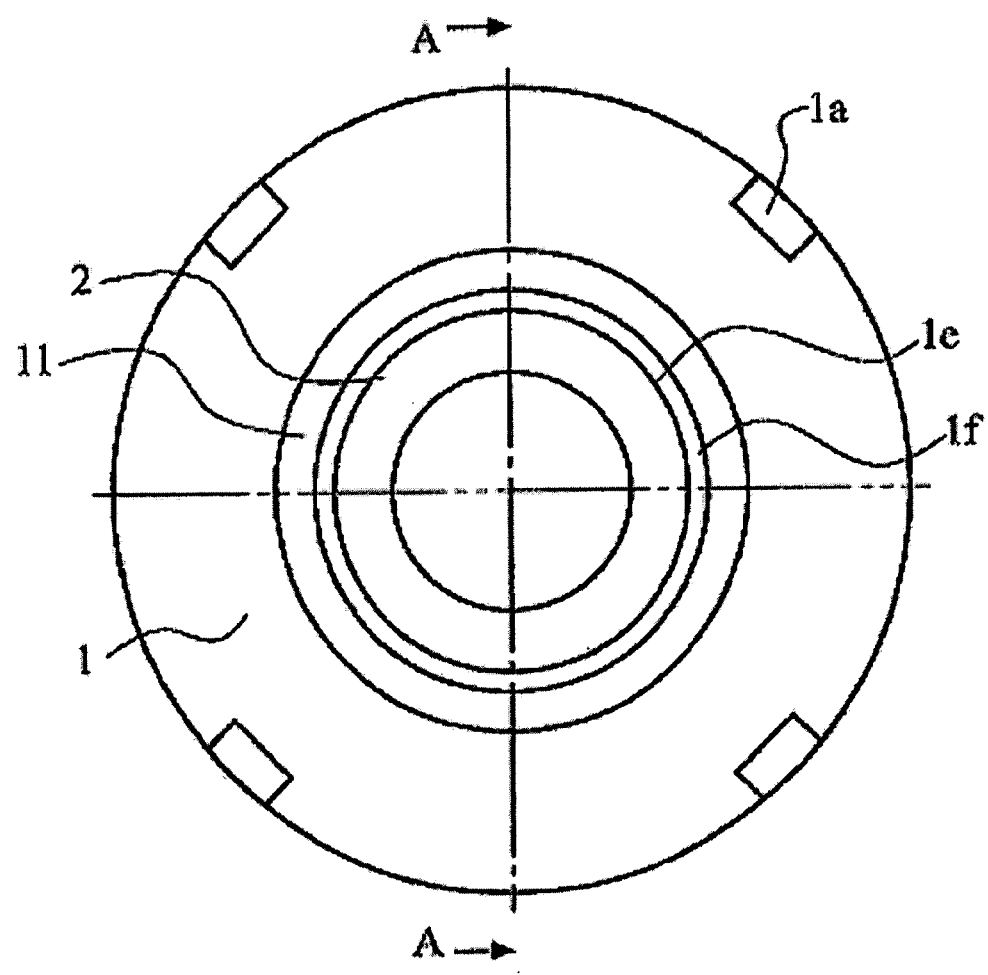
FIG. 3 is a front view of a configuration of a rotary-transducer base member and of a bearing area of the rotary encoder according to an example embodiment of the present invention.
Figure 4:
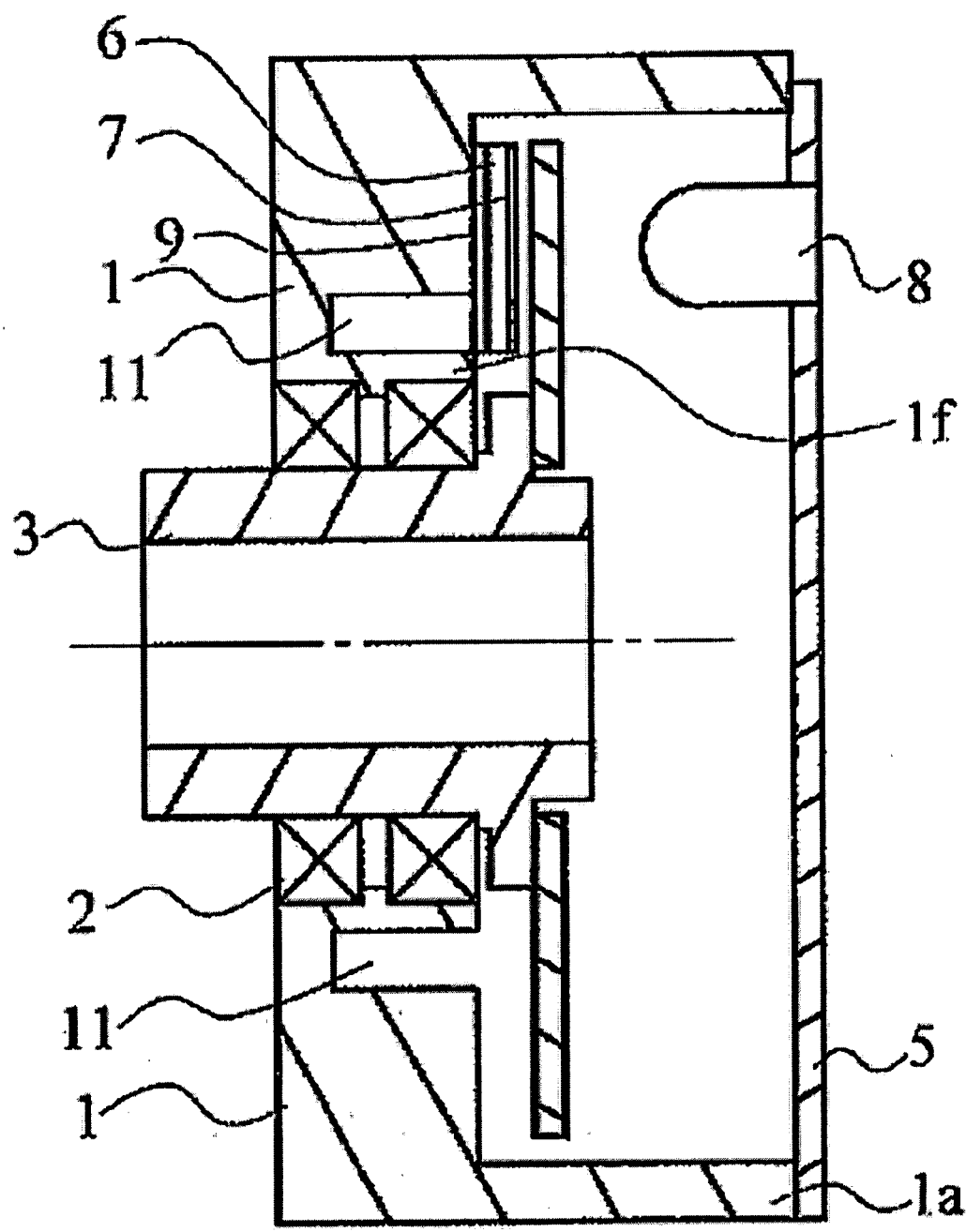
FIG. 4 is a cross-sectional view taken along line A A in FIG. 3.

FIGS. 3 and 4 illustrate a rotary encoder according to an example embodiment of the present invention. FIG. 3 is a front view with the configuration of the rotary-transducer base member and the bearing area. FIG. 4 is a cross-sectional view taken along line A-A of FIG. 3, the view of FIG. 3 having been supplemented with further components of the rotary encoder. For the same reasons as in the case of FIG. 2, base-plate supports 1a, which are not actually at this location in the sectional view, are indicated in FIG. 4.

In this example, light source 8 and detector element 6 are disposed opposite of the previous example. Therefore, light source 8 is disposed on base plate 5, while detector element 6, which has fixed scanning graduation 7 in front of it, is disposed via a further base plate 9 on rotary-transducer base member 1. Therefore, in coordination with the height of light source 8, the length of supports 1a is also greater, that is, a configuration further distant from code disk 4 is implemented.

Depression area 11 extends over the entire periphery, so that it completely surrounds shaft 3. Provided no problems exist as far as the strength is concerned, in this manner, by the implementation extending over the entire periphery without formation of a place at which the depression area is not continuous, a relief or decoupling effect is attained which is improved. Thus, influences by possible stresses may be even further suppressed. The further components of the exemplary embodiment illustrated correspond to those of FIGS. 1 and 2, which is why identical components are provided with identical reference numerals, and a more detailed explanation of them is omitted.

Figure 5:
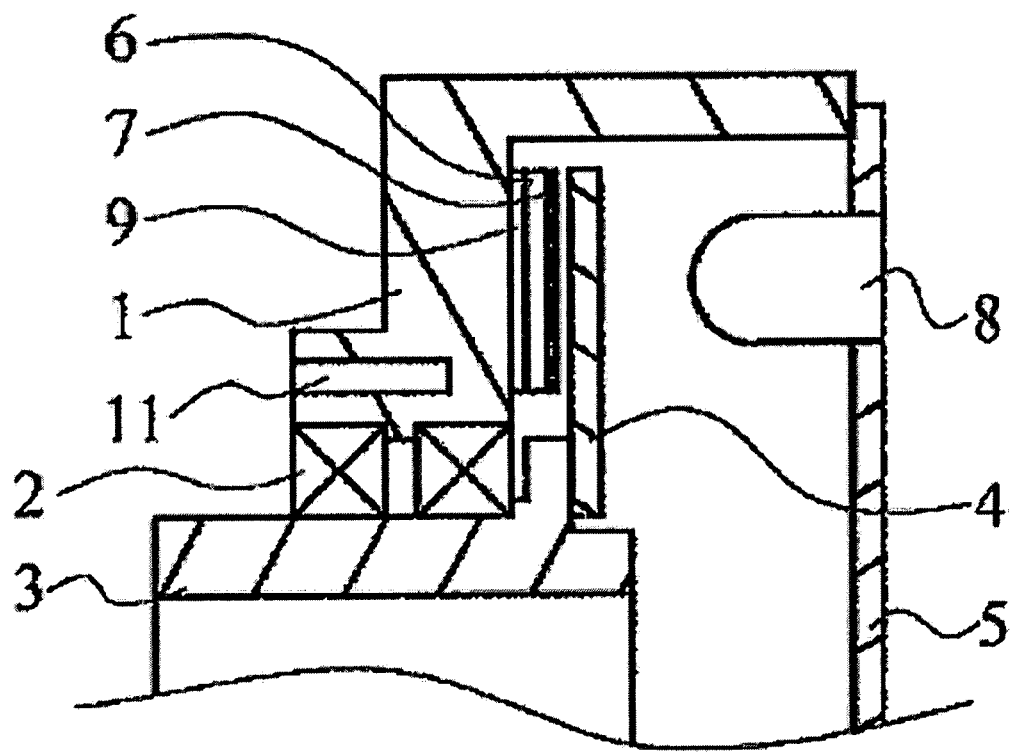
FIG. 5 is a partial cross-sectional view corresponding to FIG. 2, in which a rotary encoder according to an example embodiment of the present invention is illustrated.

FIG. 5 illustrates a rotary encoder according to an example embodiment of the present invention. FIG. 5 is a partial cross-sectional view corresponding to the cross-sectional view of FIG. 4. In this example, depression area 11 opens up at the outer side of the rotary encoder, i.e., at that side which is opposite the side at which the code disk is mounted. The width of depression area 11 is narrower than in the first and second example embodiments described above, and a gradation is formed at the outer peripheral area of the depression area. Such a construction is suited for assembly by putting together individual components, i.e., stepping of the rotary encoder. The further components correspond to those of FIGS. 3 and 4, which is why identical components are provided with identical reference numerals and a more detailed explanation of them is omitted. In this manner, depression area 11 may also be formed for a rotary encoder which has a component-wise or step-wise construction.

Figure 6:
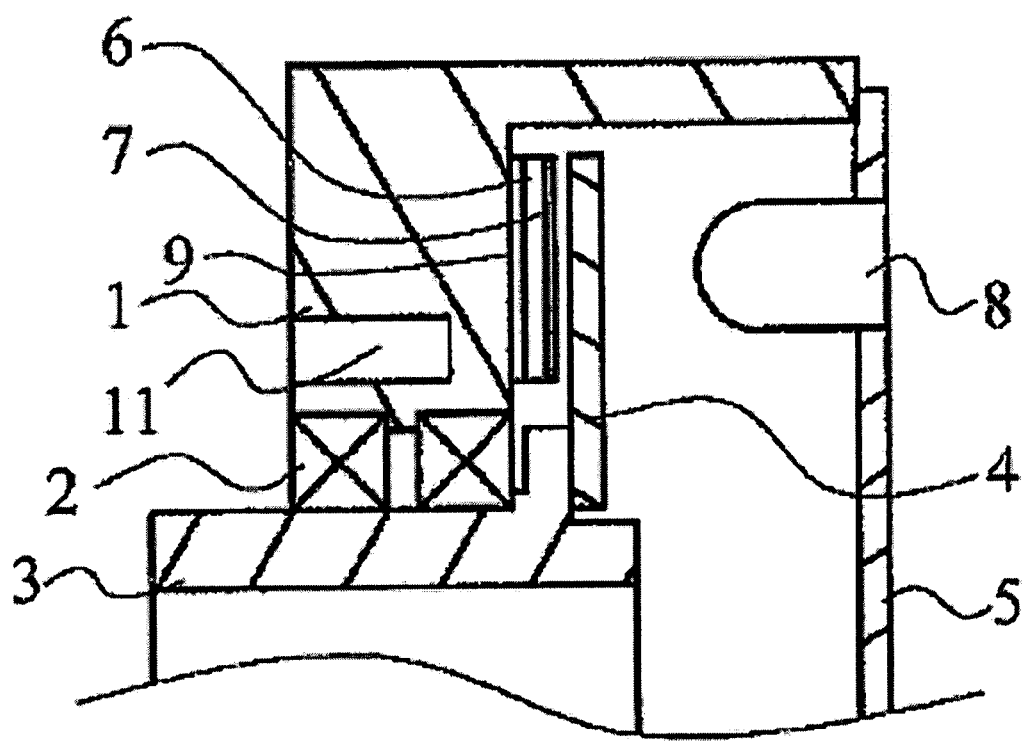
FIG. 6 is a partial cross-sectional view corresponding to FIG. 2, in which a rotary encoder according to an example embodiment of the present invention is illustrated.

FIG. 6 illustrates a rotary encoder according to an example embodiment of the present invention, it being a partial sectional cross-sectional view similar to that of FIG. 5. Since, in this example, no gradation is provided as in FIG. 5, the width of depression area 11 is approximately identical to that in the first and second exemplary embodiments. The further components correspond to those of FIG. 5, which is why identical components are provided with the identical reference numerals, and a more detailed explanation of them is omitted. In this manner, the width of depression area 11 may be enlarged when a construction of the rotary encoder in steps is not provided.

Figure 7:
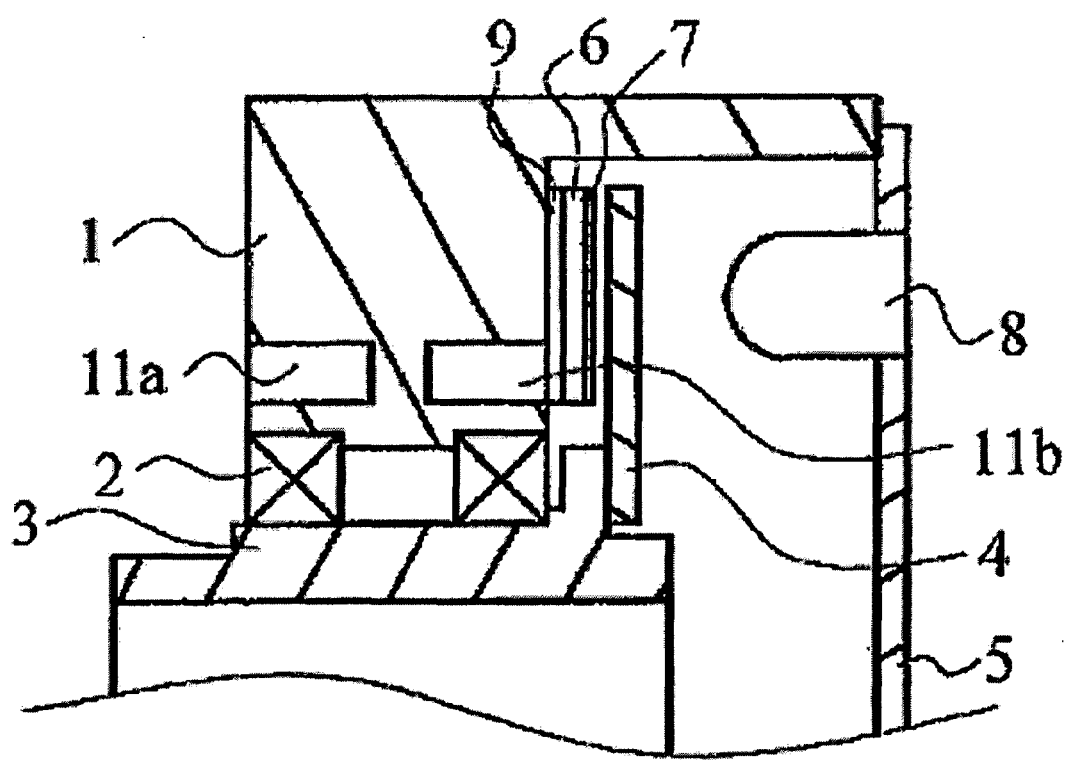
FIG. 7 is a partial cross-sectional view corresponding to FIG. 2, in which a rotary encoder according to an example embodiment of the present invention is illustrated.
Figure 8:
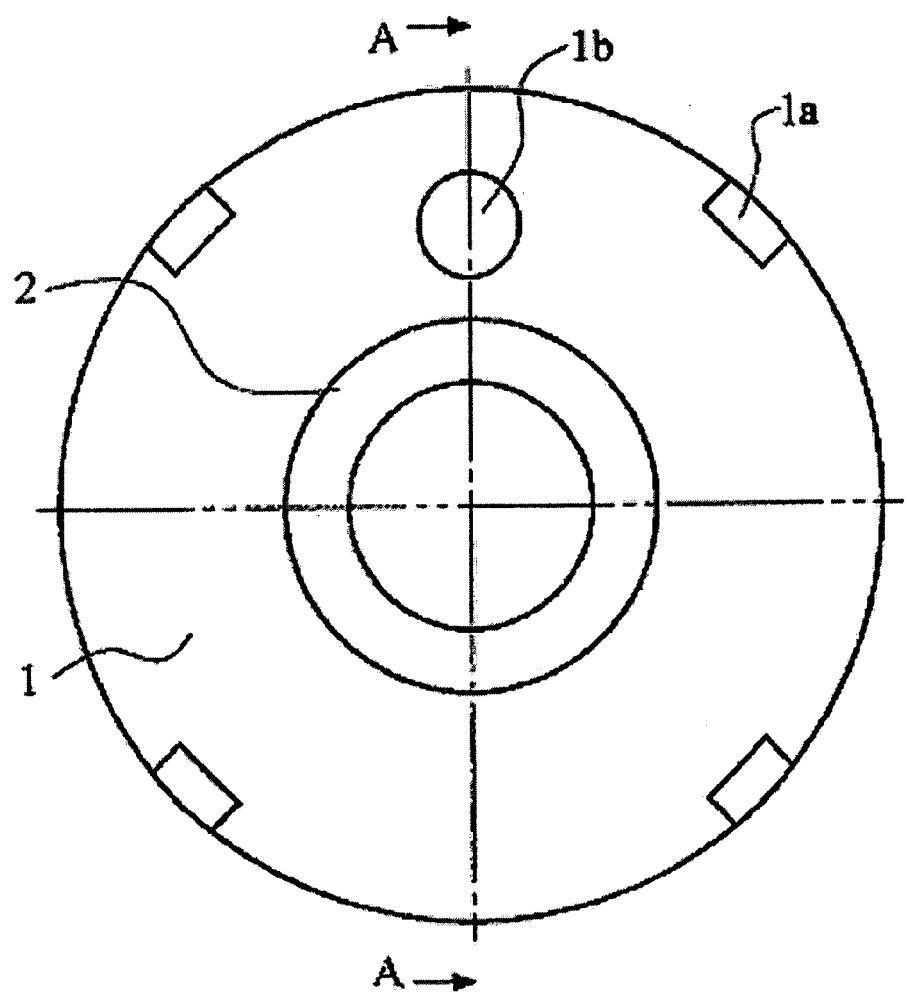
FIGS. 8-11 show the construction of conventional rotary encoders.

FIG. 7 illustrates a rotary encoder according to an example embodiment of the present invention, it being a partial cross-sectional view similar to that of FIG. 5. In this example, depression areas 11a, 11b in the form of partial depression areas open up both at the outer side and at the inner side of the rotary encoder, that is, at the side at which the code disk is mounted and at the opposite side. The width of depression areas 11a, 11b is approximately identical to that in the first and second example embodiments. The spacing of the two bearings is enlarged, which means the thickness of rotary-transducer base member 1 becomes large. The depth of depression areas 11a, 11b is greater than the thickness of one bearing—greater than this thickness by more than approximately ⅓ the thickness of one bearing. The further components correspond to those of FIG. 5, which is why identical components are provided with identical reference numerals, and a further explanation of them is omitted. In this manner, the formation of two depression areas 11a, 11b, which are located at the outer side and the inner side of rotary-transducer base member 1, is also possible. Their depth may be made greater than the bearing thickness, provided the size of the rotary encoder thereby resulting and the processing costs resulting for that purpose are acceptable.

The example embodiments described above should be considered as exemplary. Moreover, the present invention is not restricted to these example embodiments, that is, widely varying changes and modifications are possible.

Figure 9:
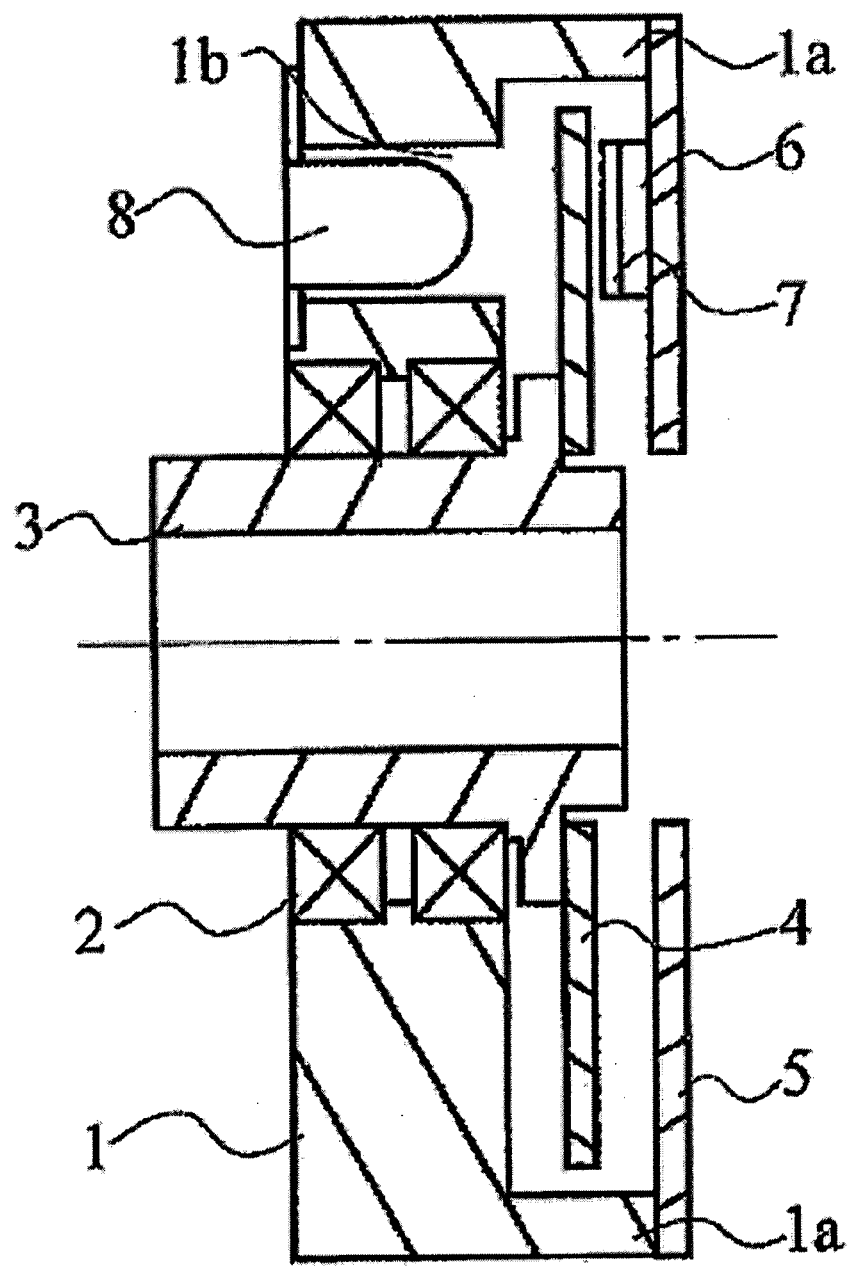
Figure 10:
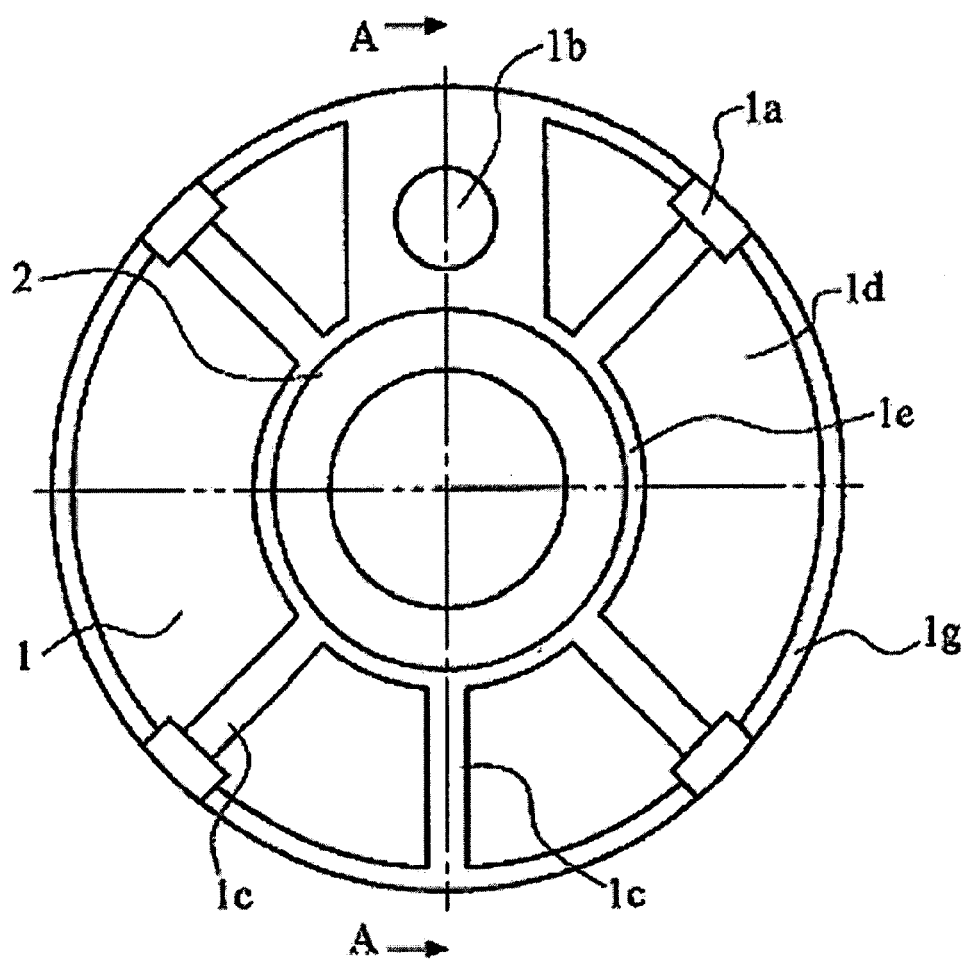
Figure 11:
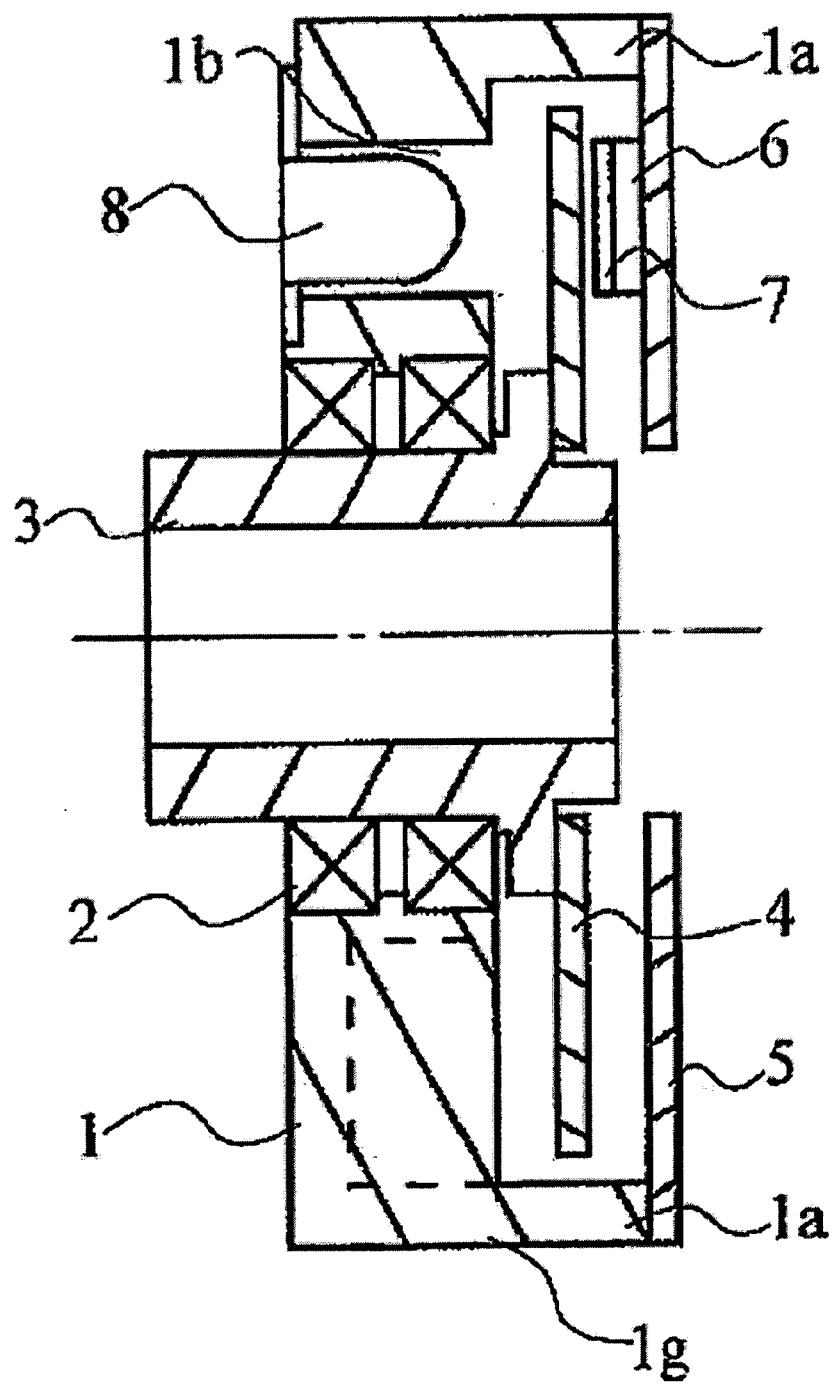

It should also be possible to confirm the advantageous effects of the measures hereof experimentally. Thus, customary resulting torque fluctuations in the range between 1.3 to 1.6 which came about in a small rotary encoder according to FIGS. 9 and 10 because of a temperature change of 60° C. on the part of the base member, should be able to be reduced to the order of magnitude of 1.0 to 1.2 by a construction such as that illustrated in FIG. 1.

As explained above, the influence by stresses which result from different coefficients of thermal expansion because of the different material properties of the bearings and of the rotary-transducer base member, can be reduced by the formation of a depression area and the at least partial formation of a thin area at the bearing fixation region. A rotary encoder with improved measuring accuracy is able to be provided, which in addition exerts no load on the object to be measured.

Example embodiments of the present invention are usable for mounting the bearings on the base member of widely varying types of rotary encoders such as, for instance, optical, magnetic or inductive rotary encoders, resolvers, etc.

What is claimed is:

1. A rotary encoder for determining rotation of an object to be measured, comprising:
   a shaft coupleable to a rotatable portion of the object to be measured;
   a code disk mounted at an end of the shaft;
   a least one bearing, the shaft rotationally mounted on the bearing; and
   a rotary-transducer base member including a bearing fixation region, the bearing fixed in position at the bearing fixation region, the rotary-transducer base member including at least one depression area open to a side at which the code disk is arranged, a part of the bearing fixation region formed as a thin area, and the depression area formed continuously with a defined depth along a periphery of the bearing fixation region to surround at least half of the periphery of the bearing fixation region.

2. The rotary encoder according to claim 1, wherein the depth of the depression area is at least greater than an extension of one bearing in a direction of a longitudinal shaft axis.

3. The rotary encoder according to claim 1, wherein the depression area extends over an entire periphery of the bearing fixation region.

4. The rotary encoder according to claim 1, wherein the depression area is arranged in an interior of the rotary encoder.

5. The rotary encoder according to claim 1, wherein the depression area is arranged at an outer side of the rotary encoder.

6. The rotary encoder according to claim 1, wherein the depression area includes two partial depression areas, a first partial depression area arranged in an interior of the rotary encoder, a second partial depression area arranged at an outer side of the rotary encoder.

7. The rotary encoder according to claim 1, wherein the at least one bearing includes a pair of bearings arranged adjacent to each other along a longitudinal shaft axis.

8. The rotary encoder according to claim 7, wherein the bearings are spaced apart from each other in a direction of the longitudinal shaft axis.

9. The rotary encoder according to claim 1, wherein the object to be measured includes at least one of (a) a motor, (b) a device and (c) a hand-driven input device.

10. The rotary encoder according to claim 9, wherein the motor includes at least one of (a) a servo motor and (b) a pulse motor.

11. The rotary encoder according to claim 1, wherein the rotary encoder is configured to measure at least one of (a) an angular position and (b) a rotational speed.

12. The rotary encoder according to claim 1, further comprising:
    a light source arranged on a first side of the code disk;
    a detector element arranged on a second side of the code disk opposite to the first side.

13. The rotary encoder according to claim 12, further comprising a fixed scanning graduation arranged between the detector element and the code disk.

14. A rotary encoder for determining rotation of an object to be measured, comprising:
    a shaft coupled to a rotatable portion of the object to be measured;
    a code disk mounted at an end of the shaft;
    a least one bearing, the shaft rotationally mounted on the bearing; and
    a rotary-transducer base member including a bearing fixation region, the bearing fixed in position at the bearing fixation region, the rotary-transducer base member including at least one depression area open to a side at which the code disk is arranged, a part of the bearing fixation region formed as a thin area, and the depression area formed continuously with a defined depth along a periphery of the bearing fixation region to surround at least half of the periphery of the bearing fixation region.

* * * * *